(12) United States Patent
Cho et al.

(10) Patent No.: US 9,908,397 B2
(45) Date of Patent: Mar. 6, 2018

(54) POWER TRANSMISSION SYSTEM OF VEHICLE

(71) Applicant: Hyundai Motor Company, Seoul (KR)

(72) Inventors: Wonmin Cho, Hwaseong-si (KR);
Seong Wook Hwang, Gunpo-si (KR);
Woochurl Son, Seongnam-si (KR);
Hyun Sik Kwon, Seoul (KR); Jae Chang Kook, Hwaseong-si (KR);
Seongwook Ji, Ansan-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/189,903

(22) Filed: Jun. 22, 2016

(65) Prior Publication Data

US 2017/0151865 A1 Jun. 1, 2017

(30) Foreign Application Priority Data

Nov. 27, 2015 (KR) .......................... 10-2015-0167975

(51) Int. Cl.
*F16H 3/66* (2006.01)
*B60K 6/365* (2007.10)
(Continued)

(52) U.S. Cl.
CPC .............. *B60K 6/365* (2013.01); *F16H 3/006* (2013.01); *F16H 3/66* (2013.01); *F16H 3/725* (2013.01);
(Continued)

(58) Field of Classification Search
CPC . B60K 6/365; Y10S 903/911; B60Y 2400/73; F16H 3/725; F16H 2003/445;
(Continued)

(56) References Cited

U.S. PATENT DOCUMENTS

| 7,288,041 | B2 * | 10/2007 | Bucknor | ................... B60K 6/40 |
| | | | | 475/10 |
| 7,931,555 | B2 | 4/2011 | Iwanaka et al. | |
| 8,777,812 | B2 | 7/2014 | Matsubara et al. | |
| 2006/0189428 | A1 * | 8/2006 | Raghavan | .............. B60K 6/365 |
| | | | | 475/5 |

(Continued)

FOREIGN PATENT DOCUMENTS

EP 0 845 618 A1 6/1998
JP 4566199 B2 10/2010

*Primary Examiner* — Roger L Pang
(74) *Attorney, Agent, or Firm* — Morgan, Lewis & Bockius LLP

(57) ABSTRACT

A power transmission system of a vehicle may include a first input shaft selectively connected to an engine, a second input shaft as a hollow shaft, enclosing the first input shaft without rotational interference with the first input shaft, and selectively connected to the engine, a speed change portion including first and second planetary gear sets, each planetary gear set including three rotation elements, and four rotation shafts directly connected to at least one rotation element among the rotation elements of the first and second planetary gear sets, a motor/generator, an output shaft, and control elements including two clutches disposed at positions where the first and second input shafts are selectively connected to an output shaft of the engine, and two brakes disposed at positions where two rotation shafts among the four rotation shafts are selectively connected to a transmission housing.

8 Claims, 7 Drawing Sheets

(51) Int. Cl.
  *F16H 3/00* (2006.01)
  *F16H 3/72* (2006.01)
  *F16H 3/44* (2006.01)

(52) U.S. Cl.
  CPC ....... *B60Y 2200/92* (2013.01); *B60Y 2400/73* (2013.01); *F16H 2003/445* (2013.01); *F16H 2200/0043* (2013.01); *F16H 2200/2007* (2013.01); *F16H 2200/2035* (2013.01); *F16H 2200/2041* (2013.01); *Y10S 903/911* (2013.01)

(58) Field of Classification Search
  CPC ..... F16H 2200/2007; F16H 2200/2041; F16H 2200/0043
  USPC .............................................. 475/5, 275–291
  See application file for complete search history.

(56) References Cited

U.S. PATENT DOCUMENTS

| | | | |
|---|---|---|---|
| 2006/0234821 A1* | 10/2006 | Bucknor | B60K 6/365 475/5 |
| 2006/0240929 A1* | 10/2006 | Raghavan | B60K 6/365 475/5 |
| 2006/0266144 A1 | 11/2006 | Schafer et al. | |
| 2007/0219035 A1* | 9/2007 | Raghavan | B60K 6/365 475/5 |
| 2008/0176696 A1* | 7/2008 | Bucknor | F16H 3/728 475/5 |
| 2008/0176697 A1* | 7/2008 | Raghavan | F16H 3/728 475/5 |
| 2012/0021861 A1 | 1/2012 | Sakai et al. | |

* cited by examiner

FIG. 2

| Speed stages | C1 | C2 | B1 | B2 | MG | Gear ratio |
|---|---|---|---|---|---|---|
| 1ST | ● | | | ● | | 2.850 |
| 2ND | ● | | ● | | | 1.532 |
| 3RD | ● | ● | | | | 1.000 |
| 4TH | | ● | ● | | | 0.713 |
| REV | | | | ● | ● | 2.480 |

POWER TRANSMISSION SYSTEM OF VEHICLE

CROSS-REFERENCE TO RELATED APPLICATION

The present application claims priority to Korean Patent Application No. 10-2015-0167975, filed Nov. 27, 2015, the entire contents of which is incorporated herein for all purposes by this reference.

BACKGROUND OF THE INVENTION

Field of the Invention

The present invention relates to a power transmission system of a vehicle. More particularly, the present invention relates to a power transmission system of a vehicle that enhances power delivery efficiency and improves marketability of the vehicle by achieving at least four fixed speed stages and enabling continuous changing of a gear ratio using a motor.

Description of Related Art

Environmental-friendliness of vehicles is a very important technology on which future survival of the motor industry is dependent. Vehicle makers are focusing on development of environmentally-friendly vehicles so as to meet environment and fuel consumption regulations.

Therefore, vehicle manufacturers have been developing future vehicles such as electric vehicles (EV), hybrid electric vehicles (HEV), and fuel cell electric vehicles (FCEV).

Since the future vehicles have technical restrictions such as weight and cost, vehicle manufacturers focus on hybrid electric vehicles for meeting exhaust gas regulations and improving fuel consumption performance and are competing desperately to put the hybrid electric vehicles to practical use.

The hybrid electric vehicles are vehicles using at least two power sources, and the at least two power sources can be combined in various ways. Typically, the hybrid electric vehicles use gasoline engines or diesel engines using fossil fuel and motor/generators driven by electrical energy.

The hybrid electric vehicle uses the motor/generator having relatively improved low-speed torque characteristics as a main power source at a low-speed and uses an engine having relatively improved high-speed torque characteristics as a main power source at a high-speed.

Since the hybrid electric vehicle stops operation of the engine using fossil fuel and uses the motor/generator at a low-speed region, fuel consumption may be improved and exhaust gas may be reduced.

The above information disclosed in this Background section is only for enhancement of understanding of the background of the invention and therefore it may contain information that does not form the prior art that is already known in this country to a person of ordinary skill in the art.

BRIEF SUMMARY

Various aspects of the present invention are directed to providing a power transmission system of a vehicle having advantages of enhancing power delivery efficiency by achieving at least four fixed speed stages and enabling continuous changing of a gear ratio using a motor.

According to various aspects of the present invention, a power transmission system of a vehicle may include a first input shaft selectively connected to an engine, a second input shaft as a hollow shaft, enclosing the first input shaft without rotational interference with the first input shaft, and selectively connected to the engine, a speed change portion including first and second planetary gear sets, each planetary gear set including three rotation elements, and four rotation shafts directly connected to at least one rotation element among the rotation elements of the first and second planetary gear sets, wherein two rotation shafts among the four rotation shafts are directly connected to the first and second input shafts respectively, a motor/generator directly connected to at least one rotation shaft of the remaining two rotation shafts among the four rotation shafts of the speed change portion, which are not connected to the first and second input shafts, an output shaft directly connected to at least one rotation shaft among the four rotation shafts of the speed change portion, which is not connected to the first and second input shafts and the motor/generator, and control elements including two clutches disposed at positions where the first and second input shafts are selectively connected to an output shaft of the engine, and two brakes disposed at positions where two rotation shafts among the four rotation shafts are selectively connected to a transmission housing.

The first planetary gear set may be a single pinion planetary gear set and include a first sun gear that is a first rotation element, a first planet carrier that is a second rotation element, and a first ring gear that is a third rotation element, and the second planetary gear set may be a single pinion planetary gear set and include a second sun gear that is a fourth rotation element, a second planet carrier that is a fifth rotation element, and a second ring gear that is a sixth rotation element.

The four rotation shafts may include a first rotation shaft directly connected to the first rotation element, directly connected to the motor/generator, and selectively connected to the transmission housing, a second rotation shaft directly connecting the second rotation element to the sixth rotation element, directly connected to the first input shaft, and selectively connected to the transmission housing, a third rotation shaft directly connecting the third rotation element to the fifth rotation element and directly connected to the output shaft, and a fourth rotation shaft directly connected to the fourth rotation element and directly connected to the second input shaft.

The control elements may include a first clutch disposed between the output shaft of the engine and the second input shaft, a second clutch disposed between the output shaft of the engine and the first input shaft, a first brake disposed between the first rotation shaft and the transmission housing, and a second brake disposed between the second rotation shaft and the transmission housing.

The first clutch and the second brake may be operated at a first forward speed stage, the first clutch and the first brake may be operated at a second forward speed stage, the first clutch and the second clutch may be operated at a third forward speed stage, the second clutch and the first brake may be operated at a fourth forward speed stage, and the second brake may be operated at a reverse speed stage, where the motor/generator may be operated at the reverse speed stage.

According to various aspects of the present invention, a power transmission system of a vehicle may include a first input shaft selectively connected to an engine, a second input shaft being a hollow shaft, surrounding the first input shaft without rotational interference with the first input shaft, and selectively connected to the engine, a speed change portion including a first planetary gear set including a first sun gear, a first planet carrier, and a first ring gear as rotation elements, a second planetary gear set including a second sun gear, a second planet carrier, and a second ring gear as rotation elements, and first, second, third, and fourth rotation shafts directly connected to at least one rotation element among the rotation elements of the first and second planetary gear sets, a motor/generator directly connected to at least one rotation shaft among the four rotation shafts, and an output shaft directly connected to another rotation shaft among the four rotation shafts, in which the first rotation shaft may be directly connected to the first sun gear, directly connected to the motor/generator, and selectively connected to a transmission housing, the second rotation shaft may directly connect the first planet carrier to the second ring gear, may be directly connected to the first input shaft, and selectively connected to the transmission housing, the third rotation shaft may directly connect the first ring gear to the second planet carrier and may be directly connected to the output shaft, and the fourth rotation shaft may be directly connected to the second sun gear and directly connected to the second input shaft.

Each of the first and second planetary gear sets may be a single pinion planetary gear set.

The various embodiments of the present invention may achieve four fixed speed stages and may change gear ratios continuously using a motor by combining input devices being a dual clutch, a speed change portion including planetary gear sets and friction elements, and a motor/generator enabling of driving and regenerative braking. Therefore, power delivery efficiency may be enhanced and marketability of the vehicle may be improved.

In addition, a length of a transmission may be shortened by reducing a space at which a conventional torque converter exists, and driving loss by the torque converter may be reduced.

In addition, since coasting energy can be used for regenerative braking and generating electricity by the motor/generator, fuel consumption may be greatly improved.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart of control elements at each speed stage applied to the exemplary power transmission system of the vehicle according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
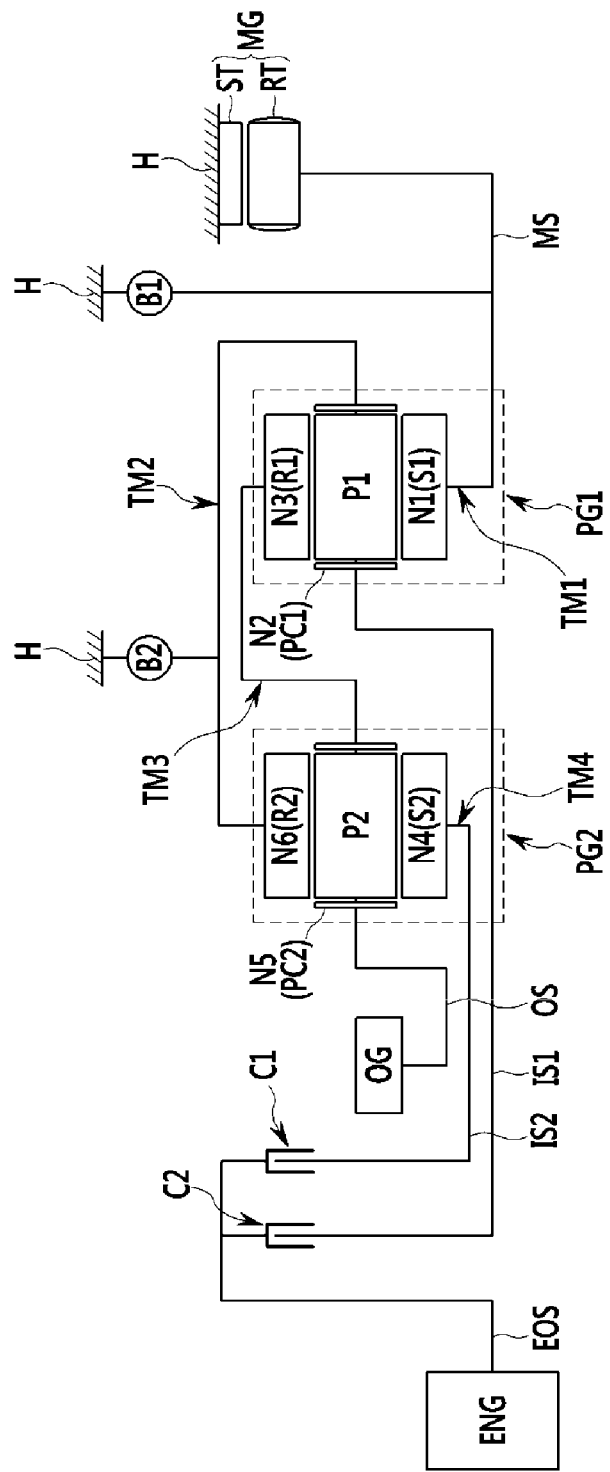
FIG. 1 is a schematic diagram of an exemplary power transmission system of a vehicle according to the present invention.

FIG. 1 is a schematic diagram of a power transmission system of a vehicle according to various embodiments of the present invention. Referring to FIG. 1, a power transmission system of a vehicle according to various embodiments of the present invention uses an engine ENG and a motor/generator MG as power sources, and includes first and second planetary gear sets PG1 and PG2 disposed on the same axis, first and second input shafts IS1 and IS2, an output shaft OS, four rotation shafts TM1 to TM4 connected to at least one of rotation elements of the first and second planetary gear sets PG1 and PG2, and four control elements C1, C2, B1, and B2.

Torque input from the first and second input shafts IS1 and IS2 and a motor shaft MS is changed through the first and second planetary gear sets PG1 and PG2, and the changed torque is output through the output shaft OS.

The first input shaft IS1 and the motor shaft MS are solid shafts and disposed on the same axis. The second input shaft IS2 is a hollow shaft and encloses the first input shaft IS1 without rotational interference therewith.

In addition, the first and second input shafts IS1 and IS2 are selectively connected to an output shaft EOS of the engine ENG through first and second clutches C1 and C2. That is, the first input shaft IS1 is selectively connected to the output shaft EOS of the engine ENG through the second clutch C2, and the second input shaft IS2 is selectively connected to the output shaft EOS of the engine ENG through the first clutch C1.

The engine ENG is a main power source, and a gasoline engine or a diesel engine using conventional fossil fuel may be used as the engine.

The motor/generator MG functions as a motor and a generator, and includes a stator ST fixed to a transmission housing H and a rotor RT rotatably supported in a radial interior of the stator ST. The rotor RT is directly connected to the motor shaft MS.

A speed change portion including the first and second planetary gear sets PG1 and PG2 is disposed between the engine ENG and the motor/generator MG. The first planetary gear set PG1 is disposed close to the motor/generator MG and the second planetary gear set PG2 is disposed close to the engine ENG.

The first planetary gear set PG1 is a single pinion planetary gear set and includes a first sun gear S1, a first planet carrier PC1 rotatably supporting a first pinion P1 that is externally meshed with the first sun gear S1, and a first ring gear R1 that is internally meshed with the first pinion P1 respectively as first, second, and third rotation elements N1, N2, and N3.

The second planetary gear set PG2 is a single pinion planetary gear set and includes a second sun gear S2, a second planet carrier PC2 rotatably supporting a second pinion P2 that is externally meshed with the second sun gear S2, and a second ring gear R2 that is internally meshed with the second pinion P2 respectively as fourth, fifth, and sixth rotation elements N4, N5, and N6.

Since the second rotation element N2 is directly connected to the sixth rotation element N6 and the third rotation element N3 is directly connected to the fifth rotation element N5, the first and second planetary gear sets PG1 and PG2 includes four rotation shafts TM1 to TM4.

The four rotation shafts TM1 to TM4 will be described in detail.

The first rotation shaft TM1 is directly connected to the first rotation element N1 (first sun gear S1), is directly connected to the motor shaft MS, and is selectively connected to the transmission housing H.

The second rotation shaft TM2 directly connects the second rotation element N2 (first planet carrier PC1) with the sixth rotation element N6 (second ring gear R2), is directly connected to the first input shaft IS1 so as to be selectively connected to the output shaft EOS of the engine ENG, is selectively connected to the transmission housing H.

The third rotation shaft TM3 directly connects the third rotation element N3 (first ring gear R1) with the fifth rotation element N5 (second planet carrier PC2), and is directly connected to an output gear OG through the output shaft OS so as to be operated as an output element continuously.

The fourth rotation shaft TM4 is directly connected to the fourth rotation element N4 (second sun gear S2) and is directly connected to the second input shaft IS2 so as to be selectively connected to the output shaft EOS of the engine ENG.

In addition, two brakes B1 and B2 that are control elements are disposed at portions at which any one rotation shaft among the rotation shafts TM1 to TM4 is selectively connected to the transmission housing H.

The first clutch C1 is disposed between the output shaft EOS of the engine and the second input shaft IS2 and selectively connects the output shaft EOS of the engine with the second input shaft IS2.

The second clutch C2 is disposed between the output shaft EOS of the engine and the first input shaft IS1 and selectively connects the output shaft EOS of the engine with the first input shaft IS1.

The first brake B1 is disposed between the first rotation shaft TM1 and the transmission housing H and causes the first rotation shaft TM1 to be operated as a selective fixed element.

The second brake B2 is disposed between the second rotation shaft TM2 and the transmission housing H and causes the second rotation shaft TM2 to be operated as a selective fixed element.

FIG. 2 is an operational chart of control elements at each speed stage applied to a power transmission system of a vehicle according to various embodiments of the present invention. As shown in FIG. 2, operation of the control elements at fixed speed stages will be described in detail.

The first clutch C1 and the second brake B2 are simultaneously operated at a first forward speed stage 1ST.

The first clutch C1 and the first brake B1 are simultaneously operated at a second forward speed stage 2ND.

The first clutch C1 and the second clutch C2 are simultaneously operated at a third forward speed stage 3RD.

The second clutch C2 and the first brake B1 are simultaneously operated at a fourth forward speed stage 4TH.

The second brake B2 is operated at a reverse speed stage REV. In this case, the motor/generator MG is also operated.

Figure 3:
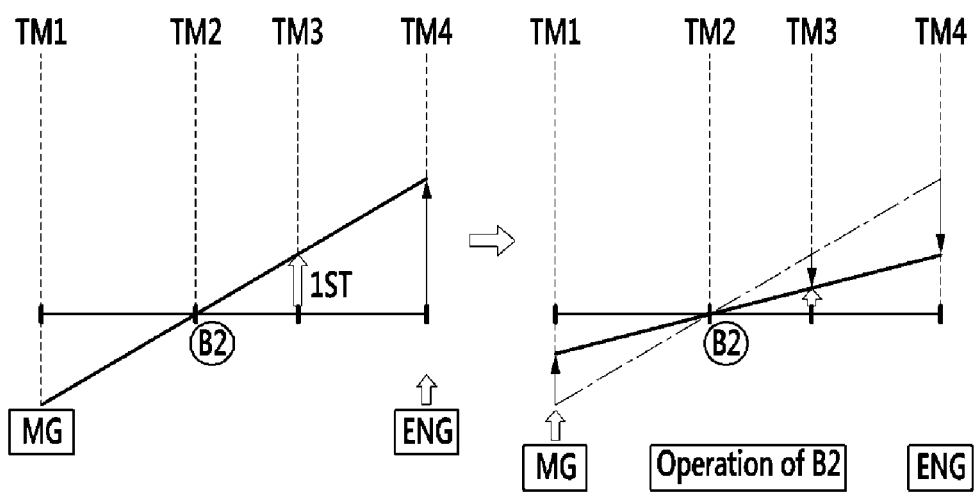
FIG. 3 is a lever diagram at a first forward speed stage in the exemplary power transmission system of the vehicle according to the present invention.
Figure 3:
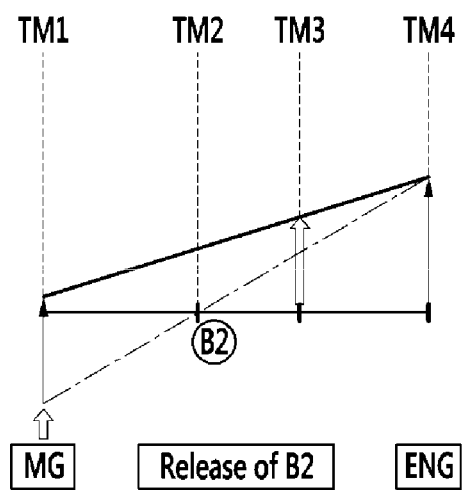

FIG. 3 is a lever diagram at a first forward speed stage in a power transmission system of a vehicle according to various embodiments of the present invention. Referring to FIG. 3, the first clutch C1 and the second brake B2 are operated at the first forward speed stage 1ST.

In addition, in a state that torque of the engine ENG is input to the fourth rotation shaft TM4 by operation of the first clutch C1, the second rotation shaft TM2 is operated as the fixed element by operation of the second brake B2. Therefore, the torque of the engine ENG is shifted into the first forward speed stage, and the first forward speed stage is output through the third rotation shaft TM3 that is the output element.

The motor/generator MG can generate electricity and can assist torque through inverse rotation of the motor/generator MG at the first forward speed stage 1ST.

Continuous change of gear ratio by the motor/generator MG at the first forward speed stage 1ST can be changed according to whether the second brake B2 is operated.

In a state that the second brake B2 is operated, the torque of the engine ENG is controlled not to be input to the speed change portion and a gear ratio can be increased by controlling an inverse rotation speed of the motor/generator MG.

In a state that the second brake B2 is not operated, the torque of the engine ENG is controlled to be input to the speed change portion and a gear ratio can be decreased by controlling the inverse rotation speed of the motor/generator MG.

Figure 4:
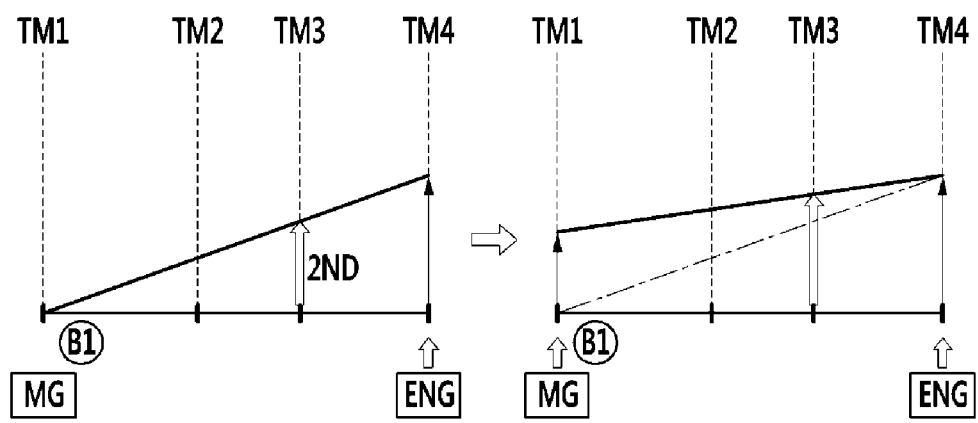
FIG. 4 is a lever diagram at a second forward speed stage in the exemplary power transmission system of the vehicle according to the present invention.

FIG. 4 is a lever diagram at a second forward speed stage in a power transmission system of a vehicle according to various embodiments of the present invention. Referring to FIG. 4, the first clutch C1 and the first brake B1 are operated at the second forward speed stage 2ND.

In a state that the torque of the engine ENG is input to the fourth rotation shaft TM4 by operation of the first clutch C1, the first rotation shaft TM1 is operated as the fixed element by operation of the first brake B1. Therefore, the torque of the engine ENG is shifted into the second forward speed stage, and the second forward speed stage is output through the third rotation shaft TM3 that is the output element.

If a gear ratio is to be changed continuously by the motor/generator MG at the second forward speed stage 2ND, the first brake B1 is released and the torque of the engine ENG is controlled to be input to the speed change portion. In this case, the gear ratio can be changed by controlling a rotation speed of the motor/generator MG.

Figure 5:
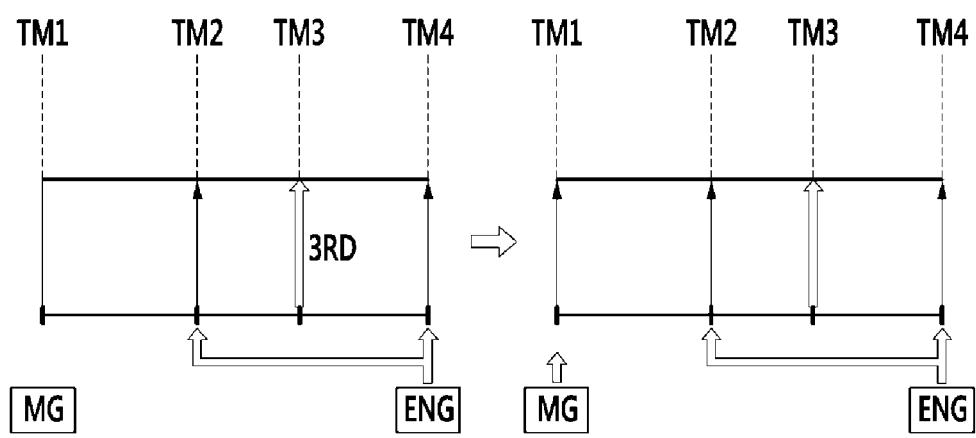
FIG. 5 is a lever diagram at a third forward speed stage in the exemplary power transmission system of the vehicle according to the present invention.

FIG. 5 is a lever diagram at a third forward speed stage in a power transmission system of a vehicle according to various embodiments of the present invention. Referring to FIG. 5, the first clutch C1 and the second clutch C2 are operated at the third forward speed stage 3RD.

The torque of the engine ENG is simultaneously input to the fourth rotation shaft TM4 and the second rotation shaft TM2 by operation of the first clutch C1 and the second clutch C2. In this case, the first and second planetary gear sets PG1 and PG2 become lock-up states. Therefore, the torque of the engine ENG is shifted into the third forward speed stage, and the third forward speed stage is output through the third rotation shaft TM3 that is the output element. The same rotation speed with the engine ENG is output at the third forward speed stage.

In addition, the motor/generator MG can assist torque by rotating in a positive direction at the third forward speed stage.

Figure 6:
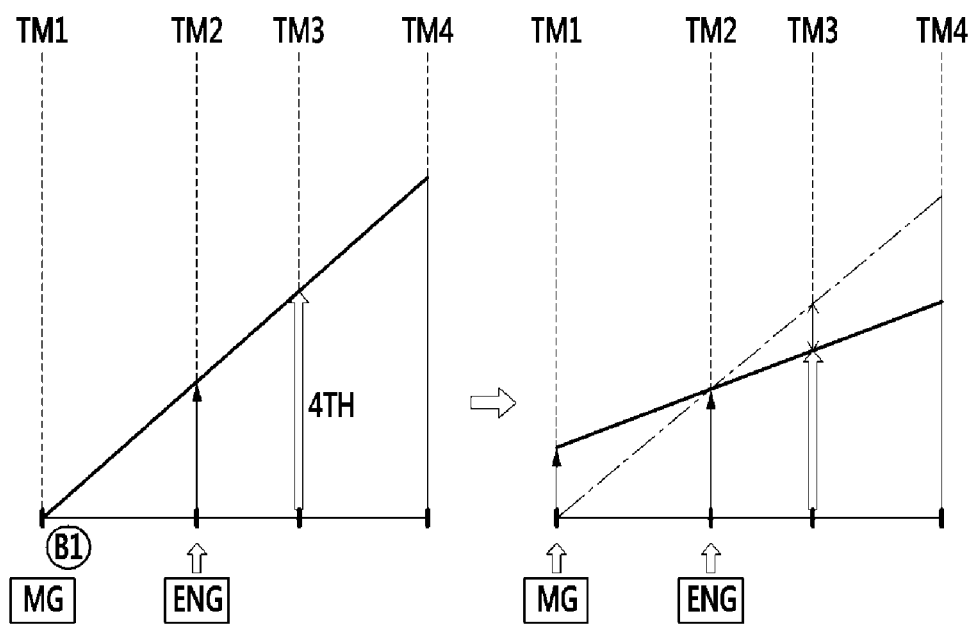
FIG. 6 is a lever diagram at a fourth forward speed stage in the exemplary power transmission system of the vehicle according to the present invention.

FIG. 6 is a lever diagram at a fourth forward speed stage in a power transmission system of a vehicle according to various embodiments of the present invention. Referring to FIG. 6, the second clutch C2 and the first brake B1 are operated at the fourth forward speed stage 4TH.

In a state that the torque of the engine ENG is input to the second rotation shaft TM2 by operation of the second clutch C2, the first rotation shaft TM1 is operated as the fixed element by operation of the first brake B1. Therefore, the torque of the engine ENG is shifted into the fourth forward speed stage, and the fourth forward speed stage is output through the third rotation shaft TM3 that is the output element.

If a gear ratio is to be continuously changed by the motor/generator MG at the fourth forward speed stage 4TH, the first brake B1 is released and the torque of the engine ENG is controlled to be input to the speed change portion. At this state, the gear ratio can be changed by controlling the inverse or the positive rotation speed of the motor/generator MG.

Figure 7:
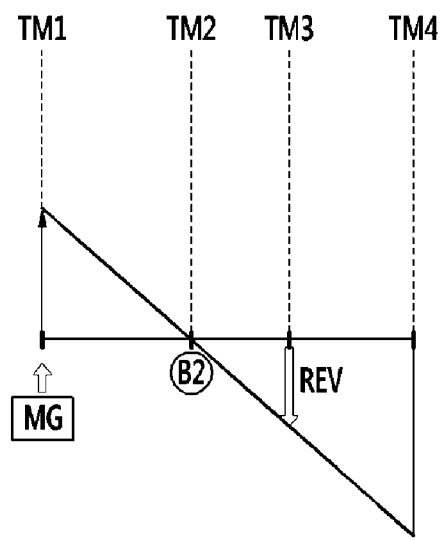
FIG. 7 is a lever diagram at a reverse speed stage in the exemplary power transmission system of the vehicle according to the present invention.

Referring to FIG. 7, in a stopped state of the engine ENG, the second brake B2 is operated and the motor/generator MG is also operated at the reverse speed stage REV.

In a state that torque of the motor/generator MG is input to the first rotation shaft TM1, the second rotation shaft TM2 is operated as the fixed element by operation of the second brake B2 and the inverse rotation speed is output. That is, the torque of the motor/generator MG is shifted into the reverse speed stage, and the reverse speed stage is output through the third rotation shaft TM3 that is the output element.

The power transmission system according to various embodiments of the present invention achieves four fixed speed stages and changes gear ratios continuously using a motor by combining input devices including a dual clutch, a speed change portion including planetary gear sets and friction elements, and a motor/generator enabling of driving and regenerative braking. Therefore, power delivery efficiency may be enhanced and marketability of the vehicle may be improved.

In addition, a length of a transmission may be shortened by reducing a space at which a conventional torque converter exists, and driving loss by the torque converter may be reduced.

In addition, since coasting energy can be used for regenerative braking and generating electricity by the motor/generator, fuel consumption may be greatly improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A power transmission system of a vehicle comprising:
a first input shaft selectively connected to an engine;
a second input shaft as a hollow shaft, enclosing the first input shaft without rotational interference with the first input shaft, and selectively connected to the engine;
a speed change portion including first and second planetary gear sets, each planetary gear set including three rotation elements, and four rotation shafts directly connected to at least one rotation element among the rotation elements of the first and second planetary gear sets, wherein two rotation shafts among the four rotation shafts are directly connected to the first and second input shafts respectively;
a motor/generator directly connected to at least one rotation shaft of the remaining two rotation shafts among the four rotation shafts of the speed change portion, which are not connected to the first and second input shafts;
an output shaft directly connected to at least one rotation shaft among the four rotation shafts of the speed change portion, which is not connected to the first and second input shafts and the motor/generator; and
control elements including two clutches disposed at positions where the first and second input shafts are selectively connected to an output shaft of the engine, and two brakes disposed at positions where two rotation shafts among the four rotation shafts are selectively connected to a transmission housing,
wherein the first planetary gear set includes first, second and third rotation elements and the second planetary gear set includes fourth, fifth and sixth rotation elements, and
wherein the four rotation shafts comprise:
a first rotation shaft directly connected to the first rotation element, directly connected to the motor/generator, and selectively connected to the transmission housing;
a second rotation shaft directly connecting the second rotation element to the sixth rotation element, wherein the second rotation shaft is directly connected to the first input shaft, and selectively connected to the transmission housing;
a third rotation shaft directly connecting the third rotation element to the fifth rotation element and directly connected to the output shaft; and
a fourth rotation shaft directly connected to the fourth rotation element and directly connected to the second input shaft.

2. The power transmission system of claim 1, wherein the first planetary gear set is a single pinion planetary gear set, a first sun gear is the first rotation element, a first planet carrier is the second rotation element, and a first ring gear is the third rotation element, and
the second planetary gear set is a single pinion planetary gear set, a second sun gear is the fourth rotation element, a second planet carrier is the fifth rotation element, and a second ring gear is the sixth rotation element.

3. The power transmission system of claim 1, wherein the control elements comprise:
a first clutch disposed between the output shaft of the engine and the second input shaft;
a second clutch disposed between the output shaft of the engine and the first input shaft;
a first brake disposed between the first rotation shaft and the transmission housing; and
a second brake disposed between the second rotation shaft and the transmission housing.

4. The power transmission system of claim 3, wherein the first clutch and the second brake are operated at a first forward speed stage,
the first clutch and the first brake are operated at a second forward speed stage,
the first clutch and the second clutch are operated at a third forward speed stage,
the second clutch and the first brake are operated at a fourth forward speed stage, and
the second brake is operated at a reverse speed stage, wherein the motor/generator is operated at the reverse speed stage.

5. The power transmission system of claim 3, wherein the first clutch and the second brake are operated at a first forward speed stage,
the first clutch and the first brake are operated at a second forward speed stage,
the first clutch and the second clutch are operated at a third forward speed stage,
the second clutch and the first brake are operated at a fourth forward speed stage, and
the second brake is operated at a reverse speed stage, wherein the motor/generator is operated at the reverse speed stage.

6. A power transmission system of a vehicle comprising:
a first input shaft selectively connected to an engine;
a second input shaft being a hollow shaft, surrounding the first input shaft without rotational interference with the first input shaft, and selectively connected to the engine;
a speed change portion including:
a first planetary gear set including a first sun gear, a first planet carrier, and a first ring gear as rotation elements;
a second planetary gear set including a second sun gear, a second planet carrier, and a second ring gear as rotation elements; and
first, second, third, and fourth rotation shafts directly connected to at least one rotation element among the rotation elements of the first and second planetary gear sets;
a motor/generator directly connected to at least one rotation shaft among the four rotation shafts; and
an output shaft directly connected to another rotation shaft among the four rotation shafts,
wherein the first rotation shaft is directly connected to the first sun gear, is directly connected to the motor/generator, and is selectively connected to a transmission housing,
the second rotation shaft directly connects the first planet carrier to the second ring gear, is directly connected to the first input shaft, and is selectively connected to the transmission housing,
the third rotation shaft directly connects the first ring gear to the second planet carrier and is directly connected to the output shaft, and
the fourth rotation shaft is directly connected to the second sun gear and is directly connected to the second input shaft.

7. The power transmission system of claim 6, wherein each of the first and second planetary gear sets is a single pinion planetary gear set.

8. The power transmission system of claim 6, further comprising:
a first clutch disposed between the output shaft of the engine and the second input shaft;
a second clutch disposed between the output shaft of the engine and the first input shaft;
a first brake disposed between the first rotation shaft and the transmission housing; and
a second brake disposed between the second rotation shaft and the transmission housing.

* * * * *